March 29, 1960 — M. E. McMAHON — 2,930,753
WASTE WATER PROCESSING SYSTEM
Filed Jan. 24, 1958
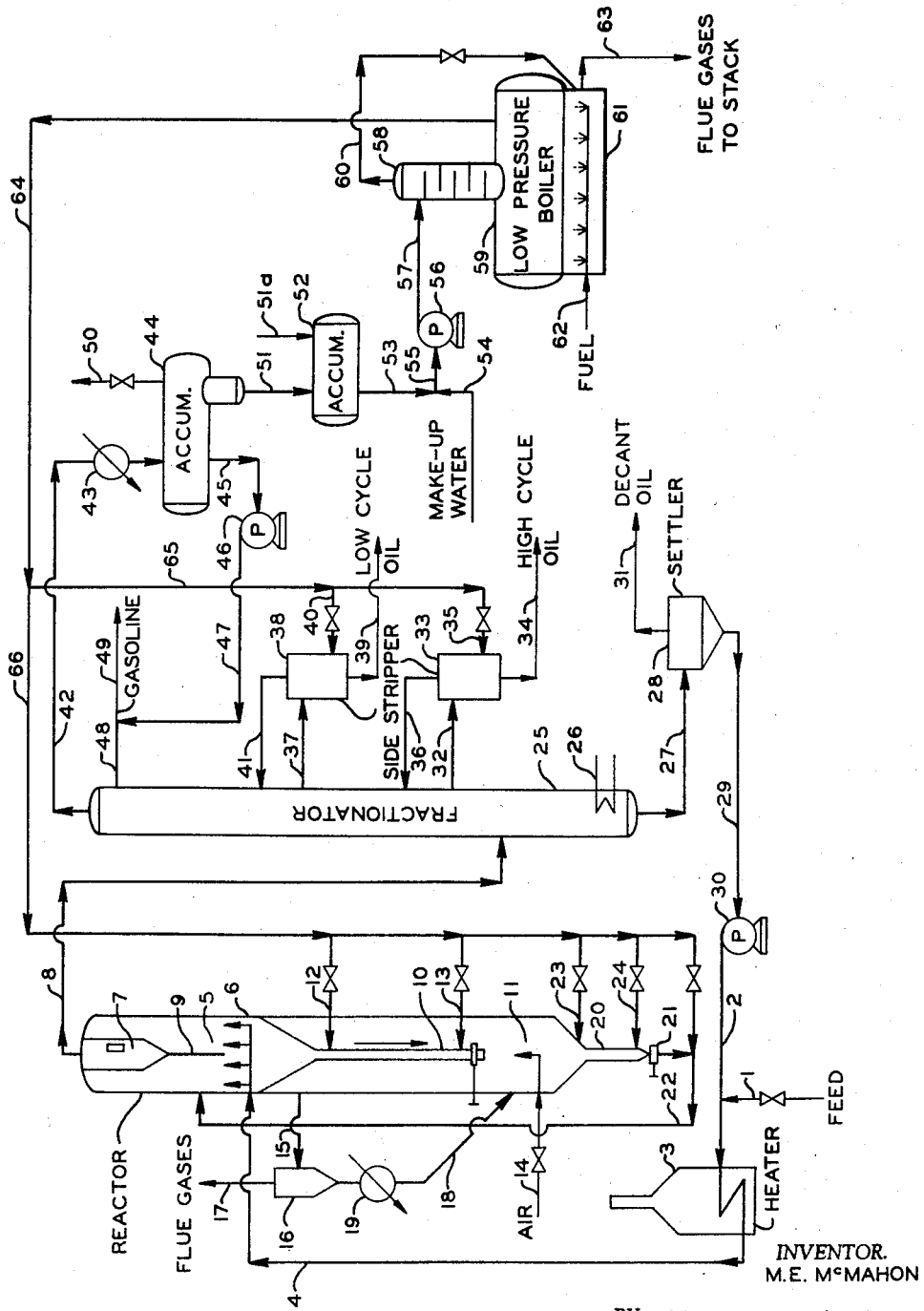
INVENTOR.
M.E. McMAHON
BY Hudson & Young
ATTORNEYS

United States Patent Office 2,930,753
Patented Mar. 29, 1960

2,930,753

WASTE WATER PROCESSING SYSTEM

Martin E. McMahon, Bartlesville, Okla., assignor to Phillips Petroleum Company, a corporation of Delaware Application January 24, 1958, Serial No. 711,003

4 Claims. (Cl. 210—21)

This invention relates to waste water treatment. In one of its aspects, this invention relates to treatment of petroleum refinery water.

In many industrial processes, water is utilized in the process for various purposes and subsequent to its use, the water contains dissolved therein objectionable materials which makes it undesirable to empty directly into streams. Many states have laws regulating the amount of waste which can be dumped and requiring various treatments. For example, one of the most obnoxious wastes in petroleum refining requiring treatment to nullify, to some extent, the detrimental properties thereof are condensate water from the main fractionator of a crude oil unit, from a cracking unit, as from other light hydrocarbon accumulators. Such water contains high concentrations of such contaminants as ammonia, hydrogen sulfide, phenolic, other acid oils, etc. Such foul waters are also encountered in other processing industries such as rayon, paper, chemicals and the like.

In present plant practices, these foul waters are treated to some extent prior to disposal of these waters from the industrial plant in order to not pollute streams and other water facilities. Such treatment of foul waters include steam stripping, flue gas stripping, air oxidation, biological treatment, chemical oxidation, extraction, settling and combinations of these processes. Such treatments are costly in that chemicals, steam, and water are used, and frequently no recovery is made of the treated foul waters.

I have now found a process wherein foul water is recovered without the waste of chemicals, steam, or water and low pressure steam is produced from the recovered water for reuse in the process producing the foul water.

It is an object of this invention to provide a novel process for recovering foul process waters.

It is another object of this invention to minimize the problem of disposal of foul waters produced in processing operttions by producing low pressure steam therefrom for reuse in the processing operation.

Still other objects, features and advantages of this invention will be obvious to those skilled in the art having been given this disclosure.

According to this invention foul water having volatile contaminants is steam stripped, the stripping steam passed to atmosphere, and the stripped water is utilized for producing steam. In a preferred embodiment, the stripping steam is utilized in the fuel burner of said boiler and the remaining steam from the boiler is passed back to the processing operation producing the foul water.

The water which can be treated by the method of this invention is any water containing volatile contaminants. In general these waters will be accumulated from a processing operation. This invention is particularly useful in the petroleum industry. For example in crude oil fractionations, water is generally associated with the crude and frequently ammonia is utilized in such a fractionator. Such crude oils will generally contain sulfur products, phenols, etc., which will pass overhead with the water thereby fouling same. In a cracking operation, steam is frequently employed as a fluidizing gas and is utilized to promote the water-gas reactions in a catalyst regenerator. The steam recovered is frequently fouled with low boiling contaminant.

The fuel used in the burning chamber of the boiler of this invention is preferably oil. In the burning of such fuel, steam is frequently employed to minimize carbon deposits and fouling of the combustion zone. In such oil burning chambers, the stripping steam is utilized for this purpose. However, in gas burners or other type burners the stripping steam can still be dissipated to the atmosphere by passing some to the flue gas stack. The amount of stripping steam is generally in the range 5 to 25 weight percent of the total steam produced.

This invention will be further described by referring to the drawing which is a schematic flow diagram of the recovery system of this invention being utilized in conjunction with a catalytic cracking unit and fractionator.

Referring now to the drawing, a feedstock is introduced to the system via conduit 1 and is passed to heater 3 via conduit 2. The heated feed passes via conduit 4 to cracking zone 5 of vessel 6. In zone 5 the feed is contacted with a cracking catalyst and the cracked products are removed via separator 7 and conduit 8. Catalyst entrained in the cracked gases is separated in separator 7 and returned to the cracking zone 5 via leg 9. The catalyst gravitates through leg 10 to regeneration zone 11. Steam as an effluent gas is admitted via conduits 12 and 13. Air is passed to regeneration zone 11 via conduit 14 and regenerates the catalyst. Regeneration gases pass overhead from this zone via conduit 15 to separator 16 wherein entrained catalyst is removed. The gases then pass to flue gas stack (not shown) via conduit 17. It is of course, within the scope of this invention to condense water from the gases in this zone, such as by utilizing same in a waste heat boiler, and sending this water to accumulator 52. The separated catalyst then passes via conduit 18 and cooler 19 back to the regeneration zone 11. The regenerated catalyst passes via leg 20, valve 21 to conduit 22 wherein steam conveys the catalyst to cracking zone 5. Diluent steam which also enters into the regeneration action by promoting the water gas reaction is admitted to this zone via conduits 23 and 24.

The cracked gases pass via conduit 8 to fractionator 25 which is equipped with a heat source 26. The heavies (high boiling material) are removed via conduit 27 and pass to thickener or settler 28 wherein entrained catalyst in oil settles out and is passed via conduit 29 and pump 30 back to conduit 2 for recycling. A heavy decant oil is removed from settler 28 via conduit 31. The fractionator has provision for removing several side streams, two of which are shown. A high boiling cycle oil is removed via conduit 32 to side stripper 33 wherein it is stripped with steam from conduit 35. The stripped oil is removed via conduit 34 to storage and the steam-containing stripped material is returned to the column via conduit 36. Similarly a low boiling cycle oil is removed to side stripper 38 via conduit 37 and passed to storage via conduit 39. Steam is admitted to side stripper 38 via conduit 40 and is returned to the fractionator 25 via conduit 41.

Gasoline and moisture from fractionator 25 passes overhead via conduit 42 and condenser 43 to accumulator 44. The condensed gasoline is removed via conduit 45, pump 46 and conduit 47 and a portion is returned to fractionator 25 as reflux via conduit 48 and the remaining is passed to storage via conduit 49. Non-condensibles from accumulator 44 are removed via conduit 50 to further processing on stock as desired. The moisture collected in accumulator 44 is passed via conduit 51 to accumulator 52. Water from other sources, if desired, are passed to accumulator 52 via conduit 51a. The foul water in accumulator 52 is removed via conduit 53 and is mixed with make up water from conduit 54 and the combined water passed via conduit 55, pump 56 and conduit 57 to stripper 58. Those skilled in the art will know that this make up water from conduit 54 can be added directly to the accumulator 52, to the boiler 59, or added as steam at any point subsequent to the boiler. In any case the water passes down through the stripper countercurrent to a flow of steam to boiler 59 wherein it is vaporized. A portion of the vaporized water passes up through stripper 58 stripping contaminants from the foul water and passes via conduit 60 to combustion zone 61. Fuel to combustion zone 61 is supplied via conduit 62 and the combustion products along with the steam and contaminants from conduit 60 pass to stack (not shown) via conduit 63 from whence they are dissipated to the atmosphere. The remaining steam produced in boiler 59 passes via conduit 64 back to conduit 65 which supplies steam to conduits 35 and 40 and to conduit 66 which supplies steam to conduits 12, 13, 22, 23 and 24.

*Specific embodiment*

In a specific operation, a virgin gas oil produced from distilling a western Kansas crude oil, said gas oil having an API (*a*) 60° F./60° F. of 30.0 is heated to a temperature in the range of 850 to 1000° F., preferably about 900° F. and is charged as a vapor via a distributor pipe into the dense phase bed of catalyst in the reactor.

The catalyst is a known catalyst for catalytically cracking hydrocarbons heavier than the gasoline boiling point range into gasoline boiling point range materials. A suitable catalyst is a natural montmorillonite (silica-alumina) having a particle size range of 10 to 100 microns, i.e., with about 50 percent passing through a 400 mesh screen. The catalyst is passed from the regenerator by means of steam as the carrying fluid into the reactor. The catalyst is at a temperature range of 950 to 1100° F., preferably at about 1050° F.

In the reactor, the pressure is in the range of 2 to 18 p.s.i.g., usually about 10 p.s.i.g., and the temperature in the range of 850 to 950° F., usually about 920° F. The catalyst to oil weight ratio may range from 1:1 up to 10:1, more preferably at about 4:1 to 5:1. The vapor-catalyst contact time in the reactor is about 10 to 15 seconds, and the catalyst residence time is generally between 1 to 10 minutes, usually about 5 minutes. The space velocity is usually about 1 or 2 volumes of liquid oil charged per hour per volume of compacted catalyst in the reaction zone (settled or catalyst at rest being the compacted catalyst). Conversion usually is 60 to 75 percent yielding about 45 to 53 volume percent debutanized 400° F. end point gasoline, respectively, and 40 to 25 volume percent cycle stocks, respectively. The remainder of the product being butylenes and lighter including hydrogen sulfide and other impurities. The research octanes, with 3 cc. TEL, are about 98.7 and 99.1 respectively. The unsaturates in the light vapors are further processed to produce polymer gasoline by known catalytic polymerization processes.

The vertical gas or vapor velocity in the reactor and regenerator may be 1 to 5 feet per second, but usually 1½ to 2½ feet per second in order to maintain the desired dense turbulent suspended catalyst phase above the point of fluid inlet in the reactor and regenerator, respectively.

The regenerator is operated at between 950 to 1100° F., preferably about 1000° F., and at a pressure substantially that of the reactor, or slightly higher.

The overhead product from the reactor is charged to conventional fractionation, the overhead comprising gasoline and lighter being in part condensed and passed to the overhead accumulator. A portion of the condensed overhead is used as reflux, the remainder being removed as gasoline product. Light uncondensed vapors and gases are recovered from the accumulator for further processing, e.g., polymerization to gasoline.

Sidestreams of light and heavy cycle oils are steam stripped in the respective side strippers, and the steam and light product being returned to the fractionator. Product cycle oils are removed from the side strippers.

Residue from the fractionator containing catalyst fines is passed to conventional thickening, e.g. a Dorr thickener, producing a hydrocarbon residue, or decant oil, and a slurry of oil and catalyst fines which is returned to the feed to the reactor, either ahead of or after the heater.

From the overhead condenser is recovered a water phase containing contaminants including ammonia, hydrogen sulfide (or ammonium sulfide), phenolic or cresylic acid materials soluble in the water.

This foul water is passed to a second accumulator, along with other water which may be foul and passed in direct countercurrent relationship with produced steam from the low pressure boiler. Steam removed overhead from the stripper containing an equilibrium quantity of the contaminants is passed to the stack or to the firebox of the boiler and thence out the stack into the atmosphere above the unit. Steam, containing an equilibrium portion of contaminants, but less than changed thereto in the foul water is reused in the process to strip the cycle oil, lift the regenerated catalyst to the reactor and as fluidizing medium in the catalyst legs to prevent bridging or plugging thereof.

An example of the foul water charged to the boiler, which is operated to produce 50 p.s.i.g. steam, show:

|  | P.p.m. |
|---|---|
| Ammonia and sulfides | 1500 |
| Acidic oils (phenols, cresols, and oxygenated hydrocarbons) | 500 |

The stripping of this charge water in the stripper of the boiler produces an actual charge water to the boiler of:

|  | P.p.m. |
|---|---|
| Ammonia and sulfides | 450 |
| Acidic oils | 200 |

The steam produced (50 p.s.i.g.) is leaner of the fouling constituents than the water charged from the system which is desired.

Split of the boiler steam:

Percent to strip → about 15%
Percent to recycled → about 85%

I claim:

1. In a process utilizing steam and producing a waste stream containing water and combustible volatile contaminating materials the improved method of disposing of said waste stream which comprises passing said waste stream to the upper portion of a vapor-liquid contacting column, passing a first vapor stream of steam and contaminating materials in lower concentration then in said waste stream to the lower portion of said column, contacting said waste stream and first vapor stream in countercurrent flow in said column to produce a second vapor overhead stream of steam and contaminating materials in higher concentration than in said first vapor stream and a liquid bottoms containing water and contaminating materials in lower concentration than in said waste stream, passing said liquid bottoms to a boiler, heating said bottoms in said boiler to produce a third vapor stream having the same composition as said first vapor stream, splitting said third vapor stream to form said first vapor stream and a fourth vapor stream, utilizing said fourth vapor stream in said process, passing said second vapor stream to a combustion zone with liquid fuel to provide heat for said heating step and produce combustion gases including combustion products of said contaminating materials, and venting said combustion gases to the atmosphere.

2. The process of claim 1 wherein said first vapor stream is from 5 to 25 weight percent of said third vapor stream.

3. The process of claim 1 wherein the process producing a waste stream is a catalytic cracking and fractionation operation and the remaining steam is returned in part to the cracking zone and in part to the fractionation zone.

4. The process of claim 1 wherein the process producing a waste stream is a crude oil fractionation.

References Cited in the file of this patent

UNITED STATES PATENTS

| | | |
|---|---|---|
| 2,625,236 | Rhinehart | Jan. 13, 1953 |
| 2,773,003 | Brown | Dec. 4, 1956 |

FOREIGN PATENTS

| | | |
|---|---|---|
| 341,302 | Great Britain | Jan. 15, 1931 |